Patented Aug. 29, 1950

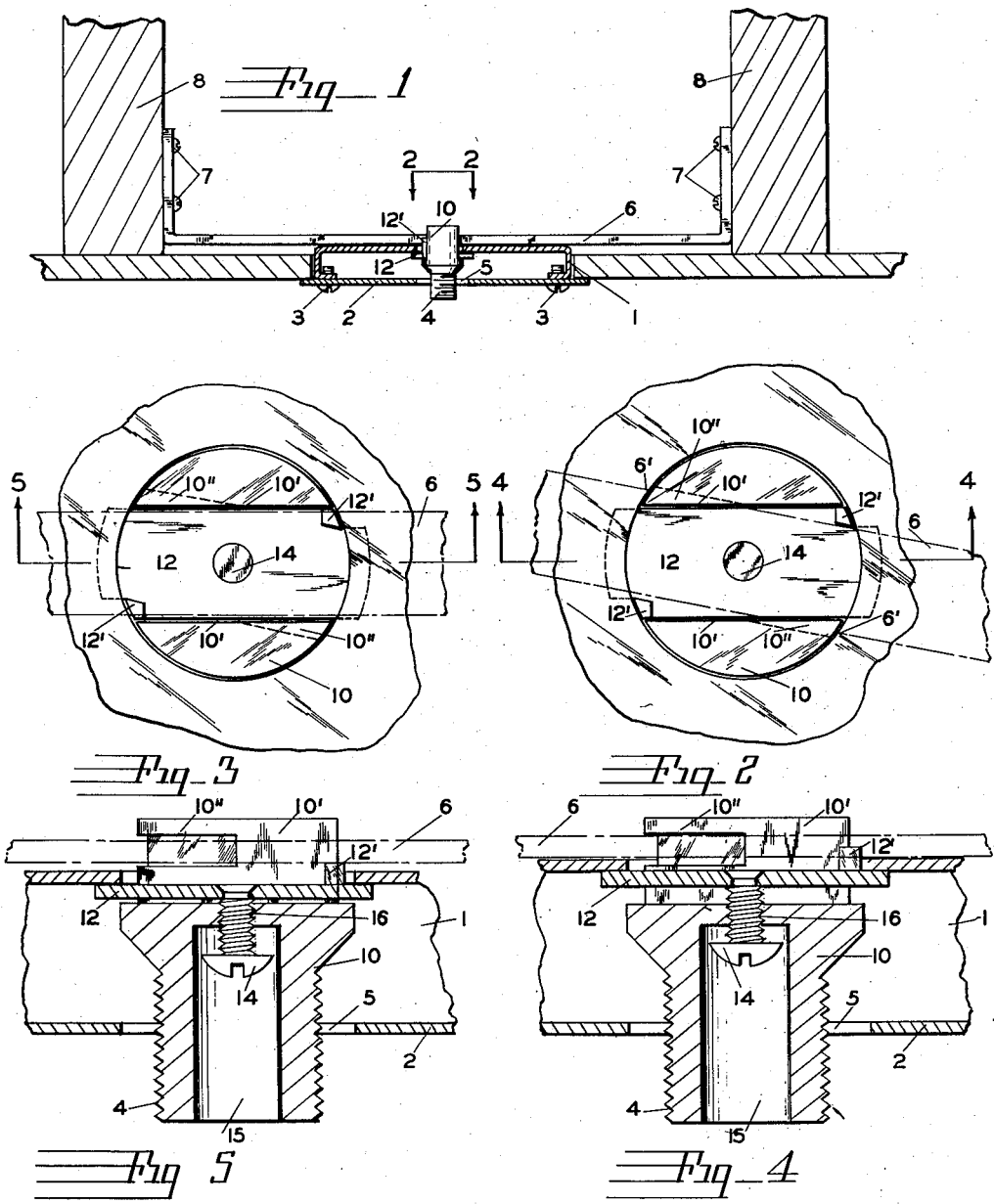

2,520,675

UNITED STATES PATENT OFFICE 2,520,675

MOUNTING STUD FOR JUNCTION BOXES

William A. Doney, Portland, Oreg.

Application September 17, 1946, Serial No. 697,555

4 Claims. (Cl. 248—57)

This invention relates to a mounting stud for junction boxes, used in electrical wiring according to the electrical codes. Two conductor conduits, either rigid in the form of steel pipes usually of half inch nominal size or the spirally wound steel clad conduit known as 2BX, are permissible. Each end of these conduits must terminate and be connected to a branch conductor or an energy consuming fixture, the junction being in all cases sealed up within a steel "junction box." Secure mounting of the conduits and the steel boxes is rigidly enforced and this is especially the case with a ceiling box with its junction box called upon to not only hold the attached conduits in rigid position but to form a support for a light fixture or other energy user, without requiring lath and plaster or other, usually light, ceiling structures to carry the weight.

It is the object of this invention to meet the foregoing requirements in an improved way as to strength and rigidity, in an improved way with respect to the time and labor consumed in its installation and in an improved way with respect to initial cost of the small metal parts of which the invention is made up.

A drawing accompanies and forms a part hereof, the ceiling box being chosen to illustrate its best application, though the same structure without change is an improvement over present practice for anchoring any junction box anywhere.

In the drawing—

Fig. 1 is a diagrammatic section of a ceiling showing the invention ready to receive conduits and to support a ceiling fixture;

Fig. 2 is an enlarged view from the orthographic plane 2—2, in Fig. 1 showing the box locked in place;

Fig. 3 is a view in the same plane but showing the box unlocked;

Fig. 4 is a section of Fig. 2 on 4—4 of that figure; and

Fig. 5 is a section of Fig. 3 on the plane 5—5 of Fig. 3.

Explaining the drawing figures in detail. Numeral 1 is a steel junction box and 2 is its flat steel cover, attached by the screws 3; and 4 is a threaded portion of the stud 10, for hanging a fixture, and projects through the knock-out hole 5 in the cover; the stud in this case forming a part of the invention and suspending the fixture from the bracket 6, which is attached at 7 to the ceiling joist 8. This setup differs from current practice which places a stud through the knockout 5 with a thin nut securing it to the cover, thus suspending the hung fixture to the box by way of the screws 3, and requiring a box support, usually a piece of wood, fitted between the joist 8 and toenailed in place with nails.

Referring now to the enlarged views of the stud 10 in Figs. 2, 3, 4 and 5, it will be seen that the stud 10 is provided with a square section slot 10' squarely across its topmost surface and that this slot is undercut at 10'' at diagonally opposite points so that a bracket 6 of suitable section will be accommodated within the slot 10' as shown in Fig. 3 and Fig. 5 simply by lifting the stud 10 upwardly against the bracket 6, and held in place by a twisting movement of the stud 10 that places two areas of the bracket 6 within the undercuts 10'' as shown at 6' in Fig. 2.

A metal lug-plate 12, preferably a stamping, rests in the bottom of the slot 10', which is deep enough to accommodate it with its upwardly projecting bent-up lugs 12', upon which the bracket is shown to be resting in Fig. 5, supported so that a relative twist sidewise will place the bracket 6 within the undercuts 10'' as shown in Fig. 2. The lug-plate 12, with its unitary upstanding lugs 12', is preferably pivotally attached to the point of a screw such as 14, within the recess 15, of the stud 10, and engaged with a mating thread 16. The length of the lug-plate is more than the diameter of the knock-out 5, hence acts as a limit stop or shoulder for the upper part of the stud.

It will be at once seen that when the bracket 6 is swung into the undercuts 10'' and the screw lifts the lug-plate 12, the bent-up lugs 12' will pass beyond the edges of the bracket 6, and being opposite the undercuts 10'' will effectively block the bracket into the undercuts where the metal of the stud 10 above the undercuts as shown at 10a, carries any load suspended from the stud, and not the metal of the lugs 12' which merely prevents the bracket from swinging back out of the undercuts. Then additional force applied to the screw 14 will have a clamping effect on the lug-plate 12, forcing it into firm contact with the underside of the bracket 6. The screw 14 thus has two functions—to raise the lugs behind the edges of the bracket and to serve afterwards like a setscrew to make the stud, box and bracket relatively immovable.

It will also be seen that the back of the box, the only place where the knock-outs for conduit attachment can be in a ceiling box, is far clearer from support structure than is possible with the usual wood support and that the box is movable along a bracket such as shown; and it will be seen that since the cover 2 is to be flush with the finished room ceiling, a few simple brackets of different form can place a box anywhere decided upon.

The central knock-outs for the stud will be found in all commercial ceiling boxes, together with other knock-outs for attaching conduit with conductors.

Not the least of the advantages is that with a reasonable amount of slack conductor wire in the box, soldering the connections with the box opening upwards or widewise and placing and locking it afterwards does away with a tedious and time consuming soldering job by reaching up into the box.

Having fully described my invention in its simplest and therefore best form, what I claim as new and desire to secure by Letters Patent, is:

1. A stud for a junction box that incorporates means for locking the box to a metal bar, comprising a metal stud adapted to occupy a knock-out, said stud provided with a rectangular open top slot in that part that enters the knock-out, said slot oppositely and diagonally undercut to contain a metal bar partly therein, a lug-plate positioned within the slot having integral lug means thereon movable to retain a metal bar in said undercut, and screw means for moving the lugs into retaining position.

2. A junction box mounting stud comprising a slotted stud member, said slot open on top and at both ends, a lug-plate mounted with said slot, said stud having an internal screw thread with a screw therein, said screw arranged to relatively move the lug-plate and the stud, said slot undercut to retain a bar inserted and twisted into said undercut and said screw effective to move said lug-plate to lock a bar into said undercut and concurrently apply compression force between a bar in the slot and the junction box within which said stud is mounted.

3. A stud for an electrical junction box having one open top slotted end and one externally threaded end, a locking member fitted movably into said slotted end, the sides of the slot being provided with diagonally positioned undercuts and means incorporated with said stud and said locking member effective to lock a junction box, the stud, and a bar together, with the externally threaded end constituting a means for supporting an electrical fixture.

4. A ceiling type fixture suspending junction box having in combination therewith, a stud that extends through knock-outs in both bottom and cover of the box, said stud provided with an open top cross slot in the box bottom penetrating end, said slot undercut at opposite diagonal bottom limits to receive a bar and engage it by turning the stud to place the bar in engagement with the undercuts, a locking device within said slot on the inside of the box, the stud being bored axially, a screw thread formed in the bore, and a screw therein to operate said locking device.

WILLIAM A. DONEY.

REFERENCES CITED

The following references are of record in the file of this patent:

UNITED STATES PATENTS

| Number | Name | Date |
|---|---|---|
| 1,056,498 | Buckels | Mar. 18, 1913 |
| 1,182,351 | Cochrane | May 9, 1916 |
| 1,332,690 | Rosenfeld | Mar. 2, 1920 |
| 2,260,829 | Carlson | Oct. 28, 1941 |
| 2,269,228 | Rugg | Jan. 6, 1942 |